(12) United States Patent
Wostbrock et al.

(10) Patent No.: US 7,029,557 B2
(45) Date of Patent: *Apr. 18, 2006

(54) METHOD FOR PRODUCING AN AQUEOUS HYDROXYLAMINE SOLUTION DEVOID OF SALT

(75) Inventors: Karl-Heinz Wostbrock, Mörstadt (DE); Joachim Thiel, Neustadt (DE); Heinz Krüger, Limburgerhof (DE); Eckhard Ströfer, Mannheim (DE); Markus Weber, Ludwigshafen (DE); Bernd Gerber, Ludwigshafen (DE); Bernd Rumpf, Hockenheim (DE); Bernd Sachweh, Meckenheim (DE); Steffen Kerth, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/482,212

(22) PCT Filed: Jul. 2, 2002

(86) PCT No.: PCT/EP02/07271

§ 371 (c)(1),
(2), (4) Date: Dec. 30, 2003

(87) PCT Pub. No.: WO03/004407

PCT Pub. Date: Jan. 16, 2003

(65) Prior Publication Data

US 2004/0149564 A1    Aug. 5, 2004

(30) Foreign Application Priority Data

Jul. 4, 2001 (DE) .................. 101 31 788

(51) Int. Cl.
*B01D 3/16* (2006.01)
*B01D 19/30* (2006.01)
*C01B 21/14* (2006.01)

(52) U.S. Cl. .......... 203/100; 202/158; 423/387; 564/497; 261/114.3; 261/DIG. 72; 422/211; 422/310

(58) Field of Classification Search .......... 203/2, 203/14, 100; 202/158; 423/387; 564/497; 261/112.2, 114.3, DIG. 72; 422/211, 310; 159/28.6

See application file for complete search history.

(56) References Cited

U.S. PATENT DOCUMENTS

| 3,721,850 | A | | 3/1973 | Giller |
|---|---|---|---|---|
| 4,532,087 | A | * | 7/1985 | Boronyak et al. ....... 261/114.3 |
| 5,389,343 | A | * | 2/1995 | Gentry ..................... 422/191 |
| 5,472,679 | A | | 12/1995 | Levinthal et al. |
| 5,556,516 | A | * | 9/1996 | Koyama et al. ............. 203/91 |
| 5,837,107 | A | * | 11/1998 | Watzenberger et al. ....... 203/78 |
| 6,059,934 | A | * | 5/2000 | Stober et al. ................. 203/40 |
| 6,153,799 | A | | 11/2000 | Watzenberger et al. |
| 6,235,162 | B1 | | 5/2001 | Sharifian et al. |
| 6,254,735 | B1 | | 7/2001 | Watzenberger |
| 6,286,818 | B1 | * | 9/2001 | Buhlmann ................... 261/97 |
| 6,299,734 | B1 | | 10/2001 | Watzenberger |
| 6,427,985 | B1 | * | 8/2002 | Kaibel et al. ............ 261/112.2 |

FOREIGN PATENT DOCUMENTS

| DE | 1 954 775 | 5/1970 |
|---|---|---|
| DE | 197 25 851 | 12/1998 |
| EP | 188 387 | 7/1986 |
| WO | 97/22551 | 6/1997 |
| WO | 98/57886 | 12/1998 |
| WO | 99/07637 | 2/1999 |

OTHER PUBLICATIONS

XP-002217526.
XP-002217527.
XP-002217527.
XP-002217526.
Roth-Weller:Gefaehrliche Chem Reaktionen, p. 3, 1984, 2, Eco-med-Verlag.

* cited by examiner

*Primary Examiner*—Virginia Manoharan
(74) *Attorney, Agent, or Firm*—Novak Druce & Quigg, LLP

(57) ABSTRACT

The invention relates to a method for producing a highly pure, aqueous hydroxylamine solution by distilling an aqueous solution, devoid of salt, of a hydroxyl ammonium salt in a plate column comprising at least two mechanical plates. Said method is characterised in that packing bodies are arranged between at least two plates of the plate column over the cross-section of said column.

11 Claims, No Drawings

METHOD FOR PRODUCING AN AQUEOUS HYDROXYLAMINE SOLUTION DEVOID OF SALT

The present invention relates to a process for the preparation of a highly pure, aqueous hydroxylamine solution by distillation of a salt-free, aqueous hydroxylamine solution in a plate-type column having at least two mechanical plates, wherein, between at least two plates of the plate-type columns, packing materials are situated over the cross section of the column.

Highly pure, concentrated, aqueous hydroxylamine solutions are used, inter alia, in the electronics industry, e.g. in combination with other substances for cleaning platens or silicon wafers. For use in the electronics industry, concentrations of the impurities, in particular metal ions, of far less than 1 ppm, "electronic grade" ware, are customarily required. At the same time, the demands on the purity of the aqueous hydroxylamine solutions are continuously increasing.

Highly pure, concentrated, aqueous hydroxylamine solutions are customarily prepared from salt-free, aqueous hydroxylamine solutions.

Hydroxylamine is prepared on a large scale as a hydroxylammonium salt, customarily as hydroxylammonium sulfate. For the preparation of salt-free, aqueous hydroxylamine solutions, an aqueous solution of a hydroxylammonium salt is treated with a base and an aqueous hydroxylamine solution is separated from the mixture, customarily by distillation, for example according to U.S. Pat. No. 5,472,679, WO 97/22551, WO 98/57886, WO 97/22550, WO 99/07637. Dilute, salt-free, aqueous hydroxylamine solutions are customarily obtained here.

Highly pure, concentrated, aqueous hydroxylamine solutions are customarily obtained from such dilute, salt-free, aqueous hydroxylamine solutions by distillation again, for example according to U.S. Pat. No. 5,472,679, WO 97/22551, WO 98/57886, WO 97/22550, WO 99/07637.

EP 188 387 A2 discloses a packed fractionation column having, above and below the feed lines and take-off locations, mechanical trays characterized by their higher pressure drop and the higher liquid hold-up thereby ameliorating any fluctuations which may otherwise act on the packing due to supply or removal of column contents. This column is recommended in particular when the stream to be fractionated passes into the column in a supercooled or superheated state. K. Sattler (ed.): Thermische Trennverfahren, 3rd edition, Wiley-VCH, Weinheim 2001, p. 242–249, gives an overview of various packings and packing elements columns. D. W. Green (ed.): Perry's Chemical Engineer's Handbook, McGraw-Hill, New York 1997, p. 14–21 to 14–61 gives an overview of gas-liquid contact apparatus such as, for example, column trays or tray columns and also structured packings, dumped packings and columns packed with structured packings and dumped packings.

U.S. Pat. No. 6,235,162 discloses a two-stage process for purifying hydroxylamine solutions which involves a first stage in which volatile constituents (such as organic solvents, ammonia, nitrogen or other gases) are expelled from the solution via a packed column. A subsequent second stage comprises the hydroxylamine solution which has remained in the receiving flask and has been freed of volatile constituents being subjected to a flashover distillation to free it of nonvolatile constituents.

The distillation of aqueous, hydroxylamine-containing solutions, even on the laboratory scale, is indicated as being a particularly hazardous operation: see Roth-Weller: Gefährliche Chemische Reaktionen, Stoffinformationen Hydroxylamin (Hazardous Chemical Reactions, Substance Information for Hydroxylamine), page 3, 1984, 2, Eco-med-Verlag.

Accordingly, the distillation mentioned demands high technical expenditure and a large time requirement.

Moreover, highly pure, concentrated, aqueous hydroxylamine. solutions, despite the second distillation, contain impurities from preparation, such as sodium sulfate or other metal compounds, in undesirably large amounts.

The present invention was therefore based on the object of making available a process for the preparation of highly pure, concentrated, aqueous hydroxylamine solutions by distillation, in which the highly pure, concentrated, aqueous hydroxylamine solutions are obtained with fewer impurities without increasing the technical expenditure, the time requirement or a safety risk.

Highly pure within the meaning of the present invention is understood as meaning metal ion contents of less than 1 ppm and hydroxylamine contents of more than 20% by weight of hydroxylamine based on the solution.

Accordingly, the process defined at the outset has been found.

In the process according to the invention, a salt-free, aqueous hydroxylamine solution is employed. The preparation of such solutions is known per se and can be carried out, for example, by the processes as in U.S. Pat. No. 5,472,679, WO 97/22551, WO 98/57886, DE 1954775.8 or WO 99/07637.

Such salt-free, aqueous hydroxylamine solutions in general have a content of hydroxylamine of 10 to 300, preferably 80 to 150, g/liter and a content of impurities, such as sodium sulfate or metal ions, in the range from 0.005 to 25 ppm.

According to the invention, a salt-free, aqueous hydroxylamine solution is distilled in a plate-type column having at least 10 practical plates.

Suitable plates are cross flow plates such as perforated plates, valve plates, bubble plates and tunnel plates or dual flow plates, preferably perforated plates. The distances of the plates from one another should be in the range from 200 to 900 mm, preferably 300 to 600 mm.

The column and plates can be manufactured from non-metallic materials, such as glass, ceramic, plastics. By this means the decomposition initiated by metal ions is excluded. Surprisingly, it has been shown, however, that the column can also be manufactured from special metallic materials, such as platinum, silver or zirconium, without a significantly increased decomposition of the hydroxylamine being observed.

Advantageously, a falling film evaporator is used for heating the bottom of the column; of course, other customary bottom heaters, such as natural or forced recirculation evaporators, plate heat exchangers etc. can also be employed.

The reflux ratio in the concentrator part can advantageously be adjusted such that it is in the range from 0.2 to 2.

According to the invention, above at least one plate of the plate-type column over the cross section of the column are situated classical packing materials such as Raschig rings, Pall rings, saddle bodies, modern high-efficiency packing materials such as the Hiflow ring (Rauschert (Steinwiesen, Germany)), super Raschig rings (Raschig (Ludwigshafen, Germany)), cascade mini-rings (Koch-Glitsch (Wichita, USA)), IMTP rings (Norton (Akron, USA)) or Nutter rings (Sulzer Chemtech (Wintherthur, Switzerland)) or structured packings such as Mellapak, Mellapak Plus or textile packing, preferably modern high-efficiency packing materials.

The packing materials should be inert to the solution to be distilled, for example made of plastics or special metallic materials, preferably of perfluorinated plastics (e.g. TFM, PFA, Teflon).

The packing height of the packing materials between the plates should be 50 to 300 mm, preferably 100 mm to 200 mm. The distance between the packing material charge and the plate above which the packing material charge is installed is between 0 and 600 mm, preferably 100 mm to 300 mm. The distance between the packing material charge and the plate below which the packing material charge is installed is 0 to 300 mm, preferably 30 to 100 mm.

Before the use of the process according to the invention, it may be advantageous to add a stabilizer. Suitable stabilizers are known per se and commercially obtainable.

The hydroxylamine solution can advantageously be fed in at a height of approximately one third of the theoretical plate number of the plate-type column. Over the head largely hydroxylamine-free water is obtained and at the bottom a hydroxylamine solution whose concentration is dependent on the distillation conditions.

In general, the distillation column is operated using a pressure in the range from 1 to 200 kPa (0.01 to 2 bar), preferably 5 to 120 kPa (0.05 to 1.2 bar), particularly preferably 30 to 110 kPa (0.3 to 1.1 bar), the pressure in each case relating to the pressure at the head/bottom of the column. The more highly the hydroxylamine is to be concentrated, the more gently (lower pressure and low temperature) it must be distilled. The distillation can be carried out continuously or batchwise.

The temperatures prevailing in the distillation column depend on the pressure at which the distillation column is operated. They are in general in the range from 10 to 160° C., preferably 60 to 110° C.

The water or the vapor removed over the head of the distillation column can be fed back again directly or after compression or superheating as strip steam into the bottom of the column employed in the process according to the invention or fed to waste water processing as waste water.

If appropriate, a device for the separation of droplets which are carried over, for example a demister, can be installed above the feed plate.

The concentrated, aqueous hydroxylamine solution, which preferably has a hydroxylamine content of more than 20, preferably more than 40 and in particular more than 50, % by weight of hydroxylamine and less than 1 ppm, in particular less than 0.1 ppm, of metal ions (in particular from the preparation or the materials used for the preparation and recovery), is in general obtained as the bottom product.

The highly pure, aqueous hydroxylamine solution obtained by the process according to the invention has a higher purity than a solution obtained by known distillation processes. In addition, the loss of hydroxylamine by means of the water to be purged is lower. Moreover, the residence time of the distillation mixture in the column is shorter and thus the thermal stress is lower than in known processes. Further, the capacity of the column is increased with the same column size and the same holdup of the column. If the column contains a demister, the burden on this is relieved compared with a known process.

EXAMPLES

Comparative Example 1

In a plate-type column having 33 plates and a diameter of 1.3 m, a solution of 8.9% by weight hydroxylamine (free base) in water was added to the 8 plates from below in an amount of 2.2 t/h.

At the head, an amount of 1.9 t/h of water having a hydroxylamine content of 1500 ppm by weight was removed at a reflux rate of 0.9 t/h and an addition of 10 kg/h of stabilizer.

At the bottom, 350 kg/h of a solution of 50% by weight hydroxylamine in water were removed.

The pressure loss over the column was 100 mbar, the energy input into the bottom evaporator 2.8 t/h of steam.

Example 1

The procedure was as in comparison example 1 with the exception that in each case a 150 mm high charge of Hiflow rings 38/1 (Rauschert, Steinwiesen, Germany) was situated on the plates.

The results as in comparative example 1 were obtained, with the exception that the water obtained as a head product only contained 1000 ppm by weight of hydroxylamine.

Example 2

The procedure was as in example 1 with the exception that the feed was 3.4 t/h.

At the head, an amount of 2.9 t/h of water having a hydroxylamine content of 1000 ppm by weight was removed at a reflux rate of 1.4 t/h and an addition of 15 kg/h of stabilizer.

At the bottom, 540 kg/h of a solution of 50% by weight hydroxylamine in water were removed.

The pressure loss over the column was 130 mbar, the energy input into the bottom evaporator 4.3 t/h of steam.

We claim:

1. A process for the preparation of a highly pure, aqueous hydroxylamine solution by distillation of a salt-free, aqueous hydroxylamine solution in a plate-type column having at least two mechanical plates, wherein, above at least one plate of the plate-type column, packing materials are situated over the cross section of the column, and wherein the packings are arranged at a distance of from 100 to 600 mm above the tray.

2. A process as claimed in claim 1, the plate-type column having 10 to 50 mechanical plates.

3. A process as claimed in claim 1, the packing materials employed being classical packing materials, high-efficiency packing materials or structured packings.

4. A process as claimed in claim 1, the temperature in the plate-type column being in the range from 10° C. to 160° C.

5. A process as claimed in claim 1, the plate-type columns employed being a cross flow plate-type column or dual flow plate-type column.

6. A process as claimed in claim 1, wherein the highly pure, aqueous hydroxylamine solution is a hydroxylamine solution which has a metal content of less than 1 ppm and a hydroxylamine content of more than 20% by weight.

7. A process as claimed in claim 1, wherein the highly pure, aqueous hydroxylamine solution has an impurities content of from 0.005 to 25 ppm.

8. The process of claim 1, wherein the distance between the tray and the packings is from 100 to 300 mm.

9. The process as claimed in claim 1, wherein the packings are arranged between an upper tray and a lower tray.

10. The process of claim 9, wherein the packings are arranged at a distance of from 0 to 300 mm below the upper tray.

11. The process of claim 9, wherein the packings are arranged at a distance of from 30 to 100 mm below the upper tray.

* * * * *

UNITED STATES PATENT AND TRADEMARK OFFICE
CERTIFICATE OF CORRECTION

PATENT NO. : 7,029,557 B2
APPLICATION NO. : 10/482212
DATED : April 18, 2006
INVENTOR(S) : Wostbrock et al.

It is certified that error appears in the above-identified patent and that said Letters Patent is hereby corrected as shown below:

In Claim 1, col. 4, indicated line 48:
the wording *"above the tray"*
should read: --above the said at least one plate--

In Claim 9, col. 5, indicated line 2:
the wording *"an upper tray and a lower tray"*
should read: --an upper plate and a lower plate--

In Claim 10, col. 5, indicated line 5:
the expression *"tray"*
should read --plate--

In Claim 11, col. 6, indicated line 3:
the expression *"tray"*
should read --plate--

Signed and Sealed this

Fourth Day of July, 2006

JON W. DUDAS
*Director of the United States Patent and Trademark Office*